United States Patent
Machhammer et al.

(10) Patent No.: US 10,351,422 B2
(45) Date of Patent: Jul. 16, 2019

(54) METHOD FOR PERFORMING ENDOTHERMIC PROCESSES

(71) Applicants: BASF SE, Ludwigshafen (DE); LINDE AG, Munich (DE)

(72) Inventors: Otto Machhammer, Mannheim (DE); Wolfgang Alois Hormuth, St Martin (DE); Christian Schneider, Mannheim (DE); Andreas Bode, Mannheim (DE); Volker Goeke, Geretsried (DE); Hans-Juergen Maass, Dresden (DE); Matthias Kern, Karlsruhe (DE); Dirk Klingler, Mannheim (DE); Rene Koenig, Ludwigshafen (DE); Philipp Brueggemann, Erlangen (DE); Jens Bernnat, Gruenstadt (DE); Grigorios Kolios, Neustadt (DE)

(73) Assignees: BASF SE, Ludwigshafen (DE); Linde AG, München (DE)

( * ) Notice: Subject to any disclaimer, the term of this patent is extended or adjusted under 35 U.S.C. 154(b) by 0 days.

(21) Appl. No.: 14/651,862

(22) PCT Filed: Dec. 12, 2013

(86) PCT No.: PCT/EP2013/076302
§ 371 (c)(1),
(2) Date: Jun. 12, 2015

(87) PCT Pub. No.: WO2014/090914
PCT Pub. Date: Jun. 19, 2014

(65) Prior Publication Data
US 2015/0321912 A1    Nov. 12, 2015

(30) Foreign Application Priority Data

Dec. 13, 2012 (DE) .................. 10 2012 024 387
Dec. 18, 2012 (EP) ..................... 12197739

(51) Int. Cl.
*C01B 3/28* (2006.01)
*B01J 19/00* (2006.01)
*B01J 8/00* (2006.01)

(52) U.S. Cl.
CPC .................... *C01B 3/28* (2013.01); *B01J 8/00* (2013.01); *B01J 19/00* (2013.01);
(Continued)

(58) Field of Classification Search
CPC ...... F24J 2/04; C01B 3/38; C01B 3/28; C01B 2203/0272; C01B 2203/0866; B01J 19/00;
(Continued)

(56) References Cited

U.S. PATENT DOCUMENTS 2,958,584 A    11/1960 Johnson et al.
4,668,494 A *  5/1987 Van Hook .............. B01J 19/127
                                              252/373

(Continued)

FOREIGN PATENT DOCUMENTS

CA    2412028 A1 *  5/2004  ................. F24J 2/38
DE    1 266 273 B     4/1968
(Continued)

OTHER PUBLICATIONS

U.S. Appl. No. 14/652,346, filed Jun. 15, 2015, Kern, et al.
(Continued)

*Primary Examiner* — Amber R Orlando
*Assistant Examiner* — Syed T Iqbal
(74) *Attorney, Agent, or Firm* — Oblon, McClelland, Maier & Neustadt, L.L.P.

(57) ABSTRACT

The invention relates to a method of carrying out heat-consuming processes, wherein the total energy required averaged over a year for the heat-consuming process originates from at least two different energy sources, where one
(Continued)

of the energy sources is an electric energy source whose power varies in the range from 0 to 100% of the total power required, and three different energy modes can individually provide the total power required for the heat-consuming process: (i) exclusively electric energy, (ii) a mixture of electric energy and at least one further nonelectric energy source or (iii) exclusively nonelectric energy, where the changeover time in which the change from one energy mode to another energy mode is completed is not more than 30 minutes.

19 Claims, 1 Drawing Sheet

(52) U.S. Cl.
CPC ............... *B01J 2208/00415* (2013.01); *B01J 2219/00135* (2013.01); *C01B 2203/0272* (2013.01); *C01B 2203/0866* (2013.01)

(58) Field of Classification Search
CPC ............... B01J 2208/00415; B01J 8/00; B01J 2219/00135
See application file for complete search history.

(56) References Cited

U.S. PATENT DOCUMENTS

| | | |
|---|---|---|
| 4,776,171 A | 10/1988 | Perry, Jr. et al. |
| 6,096,173 A | 8/2000 | Von Hippel et al. |
| 2008/0303348 A1 | 12/2008 | Witters |
| 2011/0081586 A1 | 4/2011 | McAlister |
| 2012/0186252 A1 | 7/2012 | Schmidt |
| 2013/0240369 A1 | 9/2013 | McAlister |

FOREIGN PATENT DOCUMENTS

| | | |
|---|---|---|
| JP | 61-153136 A | 7/1986 |
| JP | 2009-197733 A | 9/2009 |
| JP | 2010-235359 A | 10/2010 |
| TW | 335431 B | 7/1998 |
| TW | 201042026 A1 | 12/2010 |

OTHER PUBLICATIONS

International Search Report dated Mar. 19, 2014 in PCT/EP2013/076302.

Combined Taiwanese Office Action and Search Report dated Jun. 19, 2017 in Taiwanese Patent Application No. 10620633630 (with English translation).

* cited by examiner

METHOD FOR PERFORMING ENDOTHERMIC PROCESSES

The invention relates to a method of carrying out heat-consuming processes in which electric energy which has a time-dependent output is effectively utilized.

The proportion of renewable energies in overall power generation, which in 2011 was already 20% in Germany, will increase significantly in the next few years since increasing costs for fossil energy carriers and market regulating measures make the technologies for power generation on the basis of renewable energies economically attractive, and this situation will remain. The reduction in specific capital costs which is associated with further technical development will also contribute here. A problem is that the availability of sun, wind and water is not constant over time and, in addition, their availability is difficult to predict.

The problem of storing and thus utilizing the renewable energy is a subject which has been discussed since the 1980s. To be able to offer energy users, e.g. the chemical industry, electric power at a constant voltage despite use of renewable energies, the following, inter alia, was taken into consideration by the energy suppliers:

U.S. Pat. No. 4,776,171 describes an energy generation and management system consisting of a plurality of renewable energy sources and a plurality of energy storage sources, and also a plurality of control and distribution stations, in order to meet the requirements of industry. In U.S. Pat. No. 4,776,171, no conventional energy source is used and consequently no combination of an electric energy source with a nonelectric energy source is described.

US 2011/0081586 likewise describes a combination of a renewable energy source with an electrochemical or electrolytic cell, in which the electrochemical or electrolytic cell can compensate the fluctuations of the renewable energy source and thus make the latter continuously usable. A combination of an electric energy source with a nonelectric energy source is accordingly not disclosed.

US 2008/0303348 discloses a power station which is based exclusively on renewable energies and nevertheless makes demand-dependent control possible. US 2008/0303348 describes the combination of wind energy, solar energy and energy derived from combustion of biomass. It is stated that the power station can change smoothly and spontaneously between the three energy sources in order to cover the respective demand inexpensively at any time. However, it is questionable whether exclusively renewable energies could cover the demand of, for example, a chemical high-temperature process over the entire year.

Consideration has also been given to utilizing solar energy directly in chemical processes without smoothing the fluctuations of the solar energy beforehand in a power station. U.S. Pat. No. 4,668,494 describes a process utilizing solar energy for preparing ammonia by steam reforming of hydrocarbons or gasification of carbon-comprising fuels and reaction of the products with an ammonia synthesis gas and also conversion of the ammonia synthesis gas into ammonia. The heat required for the steam reforming of hydrocarbons or the gasification of carbon-comprising fuels is provided by a heat transfer fluid; this is heated firstly by solar energy when solar energy is available and secondly, as a function of the power of the solar energy, by combustion of part of the ammonia in order to provide the total quantity of heat required. It is stated that in the middle of the day, when the solar energy input is greatest, the ammonia burner is operated at the lowest possible firing rate. It is also stated that although solar energy could theoretically cover the entire energy demand of the ammonia synthesis, shutting down and restarting the ammonia burner would be completely impractical.

The advantage of the process described in U.S. Pat. No. 4,668,494 compared to the prior art is the saving of a power station for equalizing the fluctuations in solar energy. Furthermore, the decoupling of the reaction chamber from the heat sources is advantageous. Furthermore, the flexible usage of various heat sources and the simple regulability of the overall process are advantageous. Disadvantages are, apart from the abovementioned impossibility of running down and running up again of the ammonia burner in an acceptable time, the use of a heat transfer fluid, the costly handling associated therewith and the losses caused by heat transport resistances which occur, in particular, in the high-temperature range. Furthermore, the process described in U.S. Pat. No. 4,668,494 has the disadvantage that, at times without solar radiation, the target product ammonia has to be burnt to keep the overall process running. For example, the reformer in a process according to U.S. Pat. No. 4,668,494 in Mannheim, the $8^{th}$ sunniest city in Germany, would be heated by solar energy to an extent of about 18%; this corresponds to a requirement for burning about 35% of the ammonia produced.

In the near future, power peaks due to the introduction of an increasing proportion of renewable energies from sun, wind and water into the power grid will occur ever more frequently and can be accepted only incompletely by power consumers and are therefore offered on the power market as excess power at well below generation costs or at prices which, based on the energy content, are lower than for a fossil fuel having the same joule value or for nothing (i.e. without consideration) or even at negative prices.

To prevent voltage and frequency fluctuations or even a failure of the power grid from occurring, it is necessary that the amount of power fed into the grid always corresponds to current consumption since otherwise electric loads connected to the grid could be damaged. At present, short-term power fluctuations are compensated by means of peak load power stations as part of a system service for the grid operators.

Suitable peak load power stations are, for example, pumped or compressed air storage power stations. These can be regulated quickly and can change within minutes between power generation and power consumption in order to convert the electric energy available in excess into another form of energy. In the case of a pumped storage power station, water is for this purpose pumped from a lower level to a higher level, while in the case of the compressed air storage, the pressure of an air storage is increased by means of compressors. This energy, minus the conversion losses, is available again for power production at times when the power demand exceeds the current power production from base and middle load. Compressed air storages have the advantage that they can take up power over a prolonged period of time and can release a multiple of their uptake power to the grid again within a very short time. For example, power can be taken up during the nighttime hours of the weekend and this energy can be released at a multiple of the uptake power within 1-2 hours for the weekday evening peak. However, power stations of this type are available only in a limited number and with limited capacity since the necessary geographic and geological prerequisites and official approvals are in place only at few locations. Furthermore, compressed air storage power stations have a relatively low efficiency of about 40-50%.

In Germany, the renewable energy law guarantees producers of renewable energies priority input into the power grid. Thus, for example, a brief high occurrence of wind can lead to an oversupply of power when all rapidly available power storage possibilities are already fully loaded and the reduction in load of medium load power stations is too sluggish. In this case, the excess power is offered on the power market at very low, sometimes even negative, prices. This means that the seller sometimes pays the buyer for taking the power. The lowest price on the intraday market of the European Energy Exchange EEX in the year 2012 was about 200 €/MWh. In contrast thereto, very high prices can also occur, e.g. when a large power station goes down. Thus, the highest price in 2012 on the EEX spot market was about 550 €/MWh.

Despite all grid optimization and grid expansion measures, there are situations in which regulating down the renewable electricity generators is unavoidable because of overcapacities or lack of transport capacities, and this has to be paid for by the grid operator in whose grid the cause for the regulating-down lies. In the year 2010, 127 GWh were affected by these input management measures and about 10 million € had to be paid as compensation (monitoring report 2011 of the federal grid agency).

Regulating circuits having different speeds are used in frequency regulation in electric grids: primary regulation with a response time of less than 30 s, secondary regulation with a response time of less than 7.5 minutes and finally tertiary regulation which permits a longer response time. Primary and secondary regulation are triggered automatically and act directly on the operating state of running power stations. Tertiary regulation (or minutes reserve) is generally activated by organizational measures. The minutes response can be positive (in the case of increased power demand) or negative (in the case of reduced power demand). The positive minutes reserve is usually activated by switching on reserve power stations. The negative minutes reserve requires an energy consumer. According to the present-day state of the art, pumped storage power stations and also capacity changes in large power stations and coupled power-heat plants and also end consumers, e.g. electric arc furnaces or cool stores, are utilized for this purpose. However, their capacity is distributed nonuniformly over different regions (see IDOS report). In addition, it is conceivable that the demand for negative minutes reserve will increase as a result of the expansion of renewable energy sources. In 2010, the negative minutes reserve called upon by the four German grid operators amounted to a total of about 850 GWh (see IDOS report, FIG. 1). This corresponds approximately to the average annual power consumption of a city having 200 000 inhabitants.

The above-described problems can be overcome by sufficient availability of quickly chargeable and dischargeable energy storages. However, the storage technologies examined to the present time, e.g. batteries, flywheels, capacitors, high-temperature storages, have up to now not become established on the market since, firstly, the specific capital costs are too high and, secondly, technical problems such as spontaneous discharge or an unsatisfactorily low capacity have not been solved.

A further technology which is being discussed a great deal at the present time for utilizing and/or storing excess power is based on the electrolysis of water to produce hydrogen which can subsequently be stored and at different times be converted back into power or be processed further by a chemical route. For example, reacting the hydrogen obtained by electrolysis with carbon dioxide to give synthetic natural gas is being intensively researched at present. However, the above-described fluctuations in the availability of the excess power force a transient mode of operation of the electrolysis and thus result in a correspondingly strongly fluctuating product stream.

Electric power is at present the energy source of choice mainly for uncatalyzed gas/solid reactions and solid state reactions when large heat flows have to be introduced at a very high temperature level. Typical applications are metallurgical furnaces [Ullmann: Metallurgical Furnaces]. As sole relevant gas-phase processes, the plasma process for producing acetylene from methane [Baumann, Angewandte Chemie, edition B, volume 20 (1948), pages 257-259, 1948] and the process for producing reducing gases in the steel industry have become established industrially. Although the literature contains further indications of the use of electric energy sources in gas-phase processes, no applications which can be used economically on an industrial scale have hitherto been able to be developed from these.

Processes which use electric heating have been described for the preparation of hydrocyanic acid (HCN) from alkanes, in particular from methane and ammonia. The patent specification U.S. Pat. No. 2,958,584 discloses the preparation of HCN from propane and ammonia in an electrically heated fluidized bed composed of carbon particles, while U.S. Pat. No. 6,096,173 describes the preparation of hydrocyanic acid as gas-phase reaction of methane and ammonia using a corona discharge.

The patent application DE 1 266 273 discloses the decomposition of a hydrocarbon into hydrogen and coke, with the coke having a high purity and strength. Heating of the reaction zone is effected by electric resistance heating using the carbon bed, which is described as moving bed or fluidized bed, as resistance. Furthermore, heat integration by conveying solids stream and gas stream in countercurrent is described.

Furthermore, the use of a plasma generator for the preparation of synthesis gas has been studied (37 L. Kerker, R. Müller: "Das Plasmareforming-Verfahren zur Erzeugung von Reductionsgasen" Stahl Eisen 104, (1984) no. 22, 1137), and the use of electric or electromagnetic processes for the decomposition of hydrocarbons has been described (Häussinger, P., Lohmüller, R. and Watson, A. M. 2000. Hydrogen, 2. Production. Ullmann's Encyclopedia of Industrial Chemistry). Thus, heat can be generated inductively (DE 2 420 579) or resistively by means of electric power and transferred to the hydrocarbons (DE 1 266 273). Plasma processes such as that disclosed in the patent application WO 93/12030, in which a gas is converted into a plasma in an electric arc by ionization of its atoms or molecules, are particularly effective. The heat generated by the recombination of electrons and ions provides the energy necessary for the decomposition of the hydrocarbons.

Some important heat-consuming processes are high-temperature processes, i.e. processes which are carried out at temperatures in the range from 500 to 2500° C. As representatives of these very energy-intensive processes, mention may be made of steam reforming and dry reforming, dehydrogenations, for example of primary alcohols to aldehydes, of secondary alcohols to ketones, of alkanes to alkenes and of cycloalkanes to cycloalkenes, the preparation of hydrocyanic acid from methane and ammonia, the preparation of nitrogen monoxide, the cracking or pyrolysis of hydrocarbons and the thermolysis of water. Steam reforming and dry reforming are processes for preparing synthesis gas, viz. a mixture of carbon monoxide and hydrogen, from carbon-comprising energy carriers such as natural gas, light petroleum spirit, methanol, biogas or biomass and also water or carbon dioxide.

On an industrial scale, these processes proceed continuously and therefore require a constant supply of heat. The process heat requirement of these processes is estimated to be from 500 to 600 TWh. At present, the abovementioned high-temperature processes are carried out exclusively using energy sources which are supplied by oxidative processes (autothermal and/or allothermal). The disadvantage of these oxidative processes, i.e. firstly the raw materials dependence and limited availability of the raw materials and secondly the $CO_2$ emission associated with the oxidative processes (the $CO_2$ emissions in Germany in the year 2010 were about 960 million metric tons of $CO_2$ equivalent, with the chemical industry contributing about 5%), are adequately known.

Although the expense of achieving the high temperatures in high-temperature processes is a critical factor in the economics of the processes, the prior art makes no reference to use of inexpensive excess power, in particular a combination from an electric energy source and a nonelectric energy source. Furthermore, there is no indication that changes can be made between an electric energy source and a nonelectric energy source during the process in a high-temperature process.

It is therefore an object of the present invention to provide a method by means of which it is possible to utilize electric power which is only available with an output which fluctuates over time effectively, i.e. with a high degree of efficiency, as energy source. A further object of the present invention is to provide chemical processes as energy users in the case of a negative minutes reserve for regulating the frequency in electric grids. A further object of the present invention is to provide chemical high-temperature processes which have a low $CO_2$ footprint and thus enable fossil fuels or $CO_2$ certificates to be saved.

These stated objects are achieved according to the invention by a method for continuously carrying out a heat-consuming process by the total energy required averaged over a year for the heat-consuming process originating from at least two different energy sources, wherein one of the energy sources is an electric energy source whose power varies in the range from 0 to 100% of the total power required, and three different energy modes can individually provide the total required power for the heat-consuming process: (i) exclusively electric energy, (ii) a mixture of electric energy and at least one further nonelectric energy source or (iii) exclusively nonelectric energy, where the changeover time in which the change from one energy mode to another energy mode is completed is not more than 30 minutes.

The total power available to the heat-consuming process can advantageously deviate from the prescribed value given by the heat-consuming process by less than 10%, preferably less than 5% and particularly preferably less than 3%. The power available preferably deviates by from 0 to 5% from the prescribed value, in particular by from 0 to 3%.

Both the prescribed value and the permissible deviation can be changed over time, if, for example, the heat-consuming process is to be operated only at part load or for a time also in overload, or be kept constant. The nominal power at which the apparatus used for carrying out the heat-consuming process can be operated is preferably selected as prescribed value and is kept constant during normal operation of the apparatus.

The at least one nonelectric energy source is preferably supplied by oxidative processes such as the combustion of natural gas. However, the use of geothermal heat or solar energy for supplying the energy source is also conceivable. Furthermore, high-temperature processes can serve as nonelectric energy source by their waste heat being introduced into the heat-consuming process.

The invention therefore allows the heat-consuming process always to be operated under optimal operating conditions independently of the instantaneously available electric power, advantageously as excess power. In particular, it is possible to use excess power without intermediate storage, i.e. approximately loss-free, with an efficiency of advantageously greater than 90%, preferably greater than 95%, in particular greater than 98%, i.e. in a range of advantageously from 95 to 100%, preferably from 98 to 100%, for the heat-consuming process and thus utilize its cost advantages without significant restrictions. Consequently, energy having fluctuating power from renewable energy sources can be used directly, i.e. without a prior smoothing/compensation in a power station, in chemical processes.

Excess power is defined as power which is offered on the power market at significantly below its production costs or at prices which, based on its energy content, are lower than for a fossil fuel having the same joule value, or for nothing (i.e. without a consideration) or even at negative prices.

According to the invention, the heat-consuming process is advantageously an endothermic high-temperature process, preferably a process whose energy consumption in the reaction zone is greater than 0.5 $MW/m^3$, particularly preferably greater than 1 $MW/m^3$, in particular greater than 2 $MW/m^3$. For example, the energy consumption can be in the range from 0.5 to 10 $MW/m^3$ in the reaction zone.

For the purposes of the present invention, the term reaction zone refers to that region in the reactor in which the endothermy, i.e. the heat requirement of the reaction, advantageously exceeds 10 $kW/m^3$, preferably 100 $kW/m^3$, in particular 500 $kW/m^3$. This corresponds approximately to the region in the reactor which has a temperature of greater than 500° C.

The maximum temperature in the reaction zone is advantageously greater than 500° C., preferably greater than 800° C. For example, the temperature in the reaction zone is in the range from 500 to 2500° C., preferably from 700 to 1800° C., for example from 500 to 800° C., in the case of dehydrogenation reactions, for example from 700 to 1000° C. in the case of reforming reactions, for example from 800 to 1100° C. in the case of steam cracking reactions, for example from 800 to 1500° C. in the case of pyrolysis reactions, for example from 800 to 1200° C. in the case of carbon gasification reactions.

Examples of the energy consumption of endothermic high-temperature processes are shown in Table 1.

| Product | Temperature level of heat input [° C.] | Capacity GER [million metric t/a] | Heat requirement [GWh/a] | $CO_2$ equivalent [million metric t/a] |
|---|---|---|---|---|
| Hydrogen | 900 | 0.535 | 5572.9 | 2.25 |
| Propene | 1050 | 3.9 | 3224.2 | 1.30 |
| Styrene | 720 | 1.3 | 420.1 | 0.17 |

The exergy loss in carrying out the method of the invention is preferably less than 60%, more preferably less than 50%, particularly preferably less than 40%, in particular less than 25%, of the electric energy introduced. Exergy is the proportion of the internal energy of a system which can be converted into mechanical energy without an increase in entropy. Electric energy is virtually all exergy.

The method of the invention is particularly preferably used in the preparation of synthesis gas, of hydrogen, of styrene, propene, butene and/or benzene, of acetylene, of carbon monoxide, of hydrocyanic acid, of nitrogen monoxide and in the calcination of aluminum hydroxide. Preference is given to the following processes: steam reforming and dry reforming, the thermolysis of water, the dehydrogenation of ethylbenzene to styrene, of propane to propene, of butane to butene and/or of cyclohexane to benzene, the pyrolysis and cracking of hydrocarbons in fixed-bed or fluidized-bed processes, in particular the pyrolysis of methane, ethane, propane and/or butane and the pyrolytic preparation of acetylene, the preparation of benzene from methane, the reduction of carbon dioxide to carbon monoxide and the preparation of hydrocyanic acid from methane and ammonia and also the preparation of nitrogen monoxide from nitrogen and oxygen.

The high-temperature process according to the invention is advantageously energy-integrated into a combination site; the energy integration enables the efficiency of the heat used to be advantageously increased by 2% absolute, preferably by 3% absolute, very particularly preferably by 5% absolute, in particular by 10% absolute, compared to a separately operated high-temperature process.

The method of the invention is advantageously carried out continuously or pseudocontinuously.

Preference is given to, averaged over the year, at least 50%, particularly preferably at least 75%, even more preferably at least 90% and in particular at least 95%, of the electric energy used being provided by excess power and/or nighttime power (where nighttime power is defined as electric energy which is supplied at night, for example between 22 hours and 6 hours, and has a low tariff), preferably excess power.

Preference is given to, averaged over the year, from 50 to 100%, particularly preferably from 75 to 100%, even more preferably from 90 to 100% and in particular from 95 to 100%, of the electric energy used being provided by excess power. However, particular preference is given to all of the energy introduced via electricity into the process being provided by excess power and/or nighttime power, preferably excess power.

Averaged over the year, at least 10% of the total energy required for the heat-consuming process is preferably obtained from the electric energy source having fluctuating power, particularly preferably at least 15%, very particularly preferably at least 20% and in particular at least 25%.

A change of energy sources/energy modes is advantageously effected while carrying out the heat-consuming process. For the purposes of the present invention, a change of energy sources/energy modes is a switching-on or shutting-down of one of the energy sources, i.e. a change in the energy source mix between the modes (i), (ii) and (iii).

The change of energy sources advantageously has little adverse effect on carrying out the heat-consuming process.

The heat flow supplied to the process advantageously decreases or fluctuates by not more than 10%, preferably by not more than 5% and in particular by not more than 1%, during the changeover time.

The changeover time is, for the purposes of the invention, the time in which the change of energy sources/energy modes (from one energy mode to the other), is completed. The changeover time can be measured, for example, by means of the sum of the power of all energy sources or by means of the temperature in the reaction zone; outside the changeover time (and optionally outside the running-up or running-down of the process), the temperature in the reaction zone is preferably constant, e.g. in the case of a continuous mode of operation of the heat-consuming process, or has a periodic temperature level, e.g. in the case of a periodic mode of operation of the heat-consuming process.

The temperature in the reaction zone advantageously changes by not more than 20 K, preferably by not more than 10 K, particularly preferably by not more than 5 K, in particular by not more than 1 K, during the changeover time. Typical chemical high-temperature processes have a dynamics of 1 K/s in temperature changes.

The conversion of the heat-consuming process advantageously changes by not more than 2%, preferably by not more than 1%, particularly preferably by not more than 0.5%, in particular by not more than 0.2%, during the changeover time.

The changeover time is advantageously shorter than the required response time of the minutes reserve in electric power grids, preferably shorter than the required response time of secondary regulation (<7.5 minutes) and particularly preferably shorter than the required response time of primary regulation (<30 seconds).

The changeover time is advantageously shorter than 15 minutes, preferably shorter than 7.5 minutes, particularly preferably shorter than five minutes, more particularly preferably shorter than 60 seconds, in particular shorter than 30 seconds. The changeover time is advantageously in the range from 0 seconds to 15 minutes, preferably from 0.2 seconds to 7.5 minutes, particularly preferably from 0.5 seconds to 5 minutes, more particularly preferably from 1 second to 60 seconds, in particular from 1 second to 30 seconds.

For example, the power of burners customarily used in the prior art can be changed in a wide range from optionally "off" to reaching a temperature of, for example, 2000° C. within a few seconds (see, for example, product range of Selas-Linde).

During the change of energy modes, the by-product selectivity of the high-temperature process advantageously changes only little; the by-product selectivity preferably increases by not more than 1%, preferably by not more than 0.5%, in particular by not more than 0.2% (absolute).

The temperature profile in the reactor, in particular in the reaction zone, is advantageously constant independently of the three abovementioned energy modes. The heat flux preferably changes by less than 10%, preferably less than 5%, in particular less than 2%, during a change of the energy modes.

The starting material composition is advantageously constant independently of the three abovementioned energy modes. The volume flow of the starting materials preferably changes by less than 20%, preferably less than 10%, particularly preferably less than 5%, in particular less than 2%, during a change of the energy modes.

To provide thermal energy for the heat-consuming process via electric power, a variety of routes can be followed. Examples which may be mentioned here are inductive or resistive methods, plasma processes, heating by electrically conductive heating elements/contact areas or by means of microwaves.

The introduction of thermal energy into the process streams can, for example, be carried out outside the reactor in sections in which heat-consuming process steps are carried out, for example feed preheating, and/or inside the reactor, both outside and within the reaction zone.

For example, heat can be generated by means of the electric current in one or more electrically conductive heating elements with which a process stream to be treated, i.e.

a heat transfer medium (where the heat transfer medium can also be part of the product stream), or feed stream is brought into direct contact and thereby heated. If a heat transfer medium or feed stream is heated by direct contact with an electrically heated heating element, this can subsequently transfer heat to another process stream by direct contact and/or via a heat exchanger.

The heat transfer medium is advantageously able to be separated completely from the products and starting materials. The heat transfer medium is advantageously not an additional material compared to the process streams known from the prior art for the respective heat-consuming process. Preference is given to process streams which comprise hydrocarbons, in particular methane, ethane, propane, butane, cyclohexane and/or ethylbenzene, water, hydrogen, carbon dioxide, carbon monoxide, ammonia and/or oxygen and/or inert gases such as nitrogen. Particular preference is given to process streams which comprise methane, ethylene and/or hydrogen. In particular, hydrogen is preferred as process stream.

To generate heat, the electric power can advantageously be passed through a heating element configured as heating conductor, with heat being generated resistively. If the electric current is alternating current, an alternating magnetic field can advantageously be generated by means of this, for which purpose the current is passed through an induction coil. An electrically conductive heating element which is electrically insulated from the induction coil is advantageously arranged so that eddy currents are induced therein by the alternating magnetic field and lead to heating of the heating element as a result of the ohmic losses.

In an alternative embodiment of the invention, the electric power is used to convert at least part of the gaseous process streams into a plasma by partial ionization. The energy liberated on recombination of electrons and ions is mostly transferred to the gas atoms or molecules so as to produce a heated process stream which either is itself a heated feed stream and/or functions as heat transfer medium whose heat is subsequently transferred by direct contact and/or via a heat exchanger to a feed stream of the heat-consuming process, e.g. the hydrocarbons to be decomposed. It is advantageous to convey at least part of the gaseous process streams through a plasma generator into which a cold gas stream is introduced and from which a heated gas stream is taken off. The size of the substream which is passed through the plasma generator is determined by the quantity of heat to be transferred.

When carrying out the method of the invention in the energy mode (ii), the thermal energy which is taken from the electric energy source with power which fluctuates over time is used, for example, for producing a heated process stream, optionally a heat transfer medium, which has a constant flow and whose temperature fluctuates over time as a function of the electric power instantaneously available for heating. As an alternative, the flow of the process stream, optionally the heat transfer medium, can be regulated so that the temperature of the process stream, optionally the heat transfer medium, is, at least in a wide range, independent of the electric power available for heating it.

Preference is given to thermal energy from the electric energy source being supplied to a process stream in a first heating step when carrying out the method of the invention. If the instantaneous power of the electric energy source is not sufficient, the temperature of the process stream is increased to the desired value further downstream in at least one second heating step by introduction of thermal energy from at least one nonelectric energy source. The heating of the process stream can also take place in the reverse order, i.e. the process stream is firstly preheated by means of thermal energy from at least one nonelectric energy source and subsequently brought to the desired temperature by means of electrically generated heat.

As an alternative to the connection in series of the two or more energy sources, these energy sources can also be connected in parallel, with two or more process streams being supplied in parallel with thermal energy.

When a plasma generator is utilized as electric energy source in combination with oxidative processes, contamination of the plasma burner by flue gases should be avoided. The process streams are therefore advantageously firstly (pre)heated by means of the plasma generator and subsequently brought to the desired temperature by oxidative processes. As an alternative, the plasma generator and the oxidative process are operated in parallel.

If a nonelectric energy source in which thermal energy is generated oxidatively is used in carrying out the method of the invention, this is preferably effected by complete or partial combustion of a fuel such as hydrogen, natural gas, coal or another hydrocarbon-comprising energy carrier. The heat of the hot flue gas formed here is subsequently transferred to starting materials, for example to hydrocarbons to be decomposed, and/or to a heat transfer medium, by direct contact and/or via heat exchangers.

A gas comprising oxidizable constituents such as hydrogen or hydrocarbons, preferably methane, e.g. using natural gas, where the methane content of the natural gas is typically in the range from 75 to 99 mol % depending on the natural gas source, is alternatively used as process stream so that its heat content can be increased, preferably after electric preheating, by oxidation of oxidizable constituents. The process stream is for this purpose advantageously introduced into a burner and mixed there with an oxidant which is air or oxygen-enriched air or pure oxygen. The oxidant is introduced under quantity regulation, with the temperature of the process stream to be set downstream of the burner being used as regulated variable. The temperature of the process stream can thus be set to a predetermined value and in particular be kept constant largely independently of the electric power which is instantaneously available for heating it.

If heat is generated in heating elements by means of electric current having a power which fluctuates over time, it can be advantageous to position these heating elements in a hot gaseous process stream which is produced as flue gas in a burner.

If the heat-consuming process is the pyrolysis of hydrocarbons, the hydrocarbons are advantageously heated to above their decomposition temperatures in order to achieve thermodynamic equilibrium, i.e. the residence time in the reaction zone is long enough to ensure that the thermodynamic equilibrium is reached, so that they decompose into hydrogen and carbon. However, it is also possible to make the time above the decomposition temperature so short that thermodynamic equilibrium is not established. This gives a product gas stream which comprises not only hydrogen and carbon but also unsaturated hydrocarbon compounds and aromatics together with unreacted saturated hydrocarbons such as methane and/or ethane.

In an alternative embodiment of the invention, process streams are advantageously heated within the reaction zone. For example, resistance rods and fired radiator tubes can be arranged in the reaction zone. The radiator tubes are preferably combined with recuperative or regenerative burners (J. A. Wünning, J. G. Wünning: Regeneratorbrenner für Strahlheizrohre. Deutscher Flammentag, Berlin, 2007). The fuel supply to the burners is advantageously regulated via a malfunction parameter connection in such a way that the prescribed value for the temperature in the reaction zone can be adhered to in the case of varying power of the electric energy source. In this configuration, the process streams are separated from the flue gases of the oxidative combustion. The heat is transferred indirectly via the wall of the radiator tube. In this way, contamination of the process streams is effectively prevented by the combination of electric heating and oxidative heating. For example, the electrically heated radiation tubes and the oxidatively heated radiation tubes can be arranged alternately in the reaction space.

A patent application filed under the number DE102011106645.8 at the German Patent and Trade Mark Office, whose contents are fully incorporated by reference into the present patent application, describes a process for the decomposition of hydrocarbons, in which the hydrocarbons to be decomposed are conveyed through a high-temperature zone arranged in a bed of granular material and are decomposed thermally into hydrogen and carbon. The granular material is advantageously composed of particles which comprise metal, ceramic, carbon and/or coke, preferably carbon and/or coke having a carbon content in the range from 50 to 100% by weight. Embodiments of this process provide for the energy required for the decomposition to be provided by means of electric power and/or oxidatively. Since this type of hydrocarbon decomposition appears to be particularly suitable for being carried out according to the method of the invention, it is proposed that electric power be supplied in the form of excess power and its power fluctuations over time be compensated by thermal energy having a power which varies over time being generated oxidatively and being made available for hydrocarbon decomposition in such a way that the total power available for the decomposition of the hydrocarbons always corresponds to a prescribed value or approximates the latter.

The $CO_2$ emission in the process of the invention for, for example, 100 kg of hydrogen is advantageously less than 6.6 kg of $CO_2$/kg of $H_2$, preferably less than 6.4 kg of $CO_2$/kg of $H_2$, in particular less than 6.2 kg of $CO_2$/kg of $H_2$.

The $CO_2$ emission in the process of the invention is advantageously reduced by from 10 to 20% compared to the analogous processes of the prior art using oxidative energy sources.

The method of the invention allows high-temperature processes to be used as negative minutes reserve in frequency regulation in electric grids. As a result of the method of the invention, these high-temperature processes can be switched on quickly and can also take off large quantities of energy of 500 to 600 TWh. Operated continuously, these processes are continually available for acceptance of excess power, for example nighttime power.

High-temperature processes are particularly well suited for utilizing electric energy since the conversion of electric energy into heat causes only a small exergy loss. The conversion into heat nullifies part of the exergy. This proportion decreases with increasing temperature level of the heat sink, in the present case an endothermic high-temperature process. Since these processes are largely integrated in energy terms into combination sites, the maximum technically possible proportion of the internal energy of the product steams can be reconverted into exergy, for example in the form of high-pressure steam.

The invention thus allows the high-temperature processes, e.g. the decomposition of hydrocarbons, to be carried out always under optimal operating conditions independently of the electric energy available at the particular time. In particular, it is possible to use inexpensive excess power without intermediate storage or prior smoothing/compensation in a power station and thus utilize its cost advantages without significant restrictions. Furthermore, the invention allows continuous operation in which, for example, the (decomposition) products are produced in an amount and composition which is constant over time despite changing between two or more different energy sources.

The economic advantages given by the use of the method of the invention will be illustrated with the aid of two examples:

In the year 2010, 127 GWh of electric energy could not be produced from renewable sources in Germany because of overcapacities; furthermore, the negative minutes reserve tapped by the four German grid operators amounted to a total of about 850 GWh. About 100 000 metric tons of hydrogen could have been produced by pyrolysis of methane (at an efficiency of about 66%) by means of this energy. In a conventionally heated process, about 25 million € of costs would have been incurred for this quantity of energy, under the assumption of specific energy costs of 8 €/GJ.

In the case of a plant having a hydrogen production rate of 20 000 standard $m^3$/h, the power requirement for the thermal decomposition of the methane used is about 15 MW. At present, excess power amounting to a total quantity of energy of about 12 GWh is available for essentially no cost for about 800 hours per year. If the same quantity of energy were to be produced by combustion of methane, this would incur costs of about 350 000 €, under the assumption of 8 €/GJ. It is to be expected that the savings potential will increase significantly in the future as a result of increasing availability of excess power.

Furthermore, the invention will be illustrated with the aid of an example depicted schematically in FIG. 1.

Figure 1:
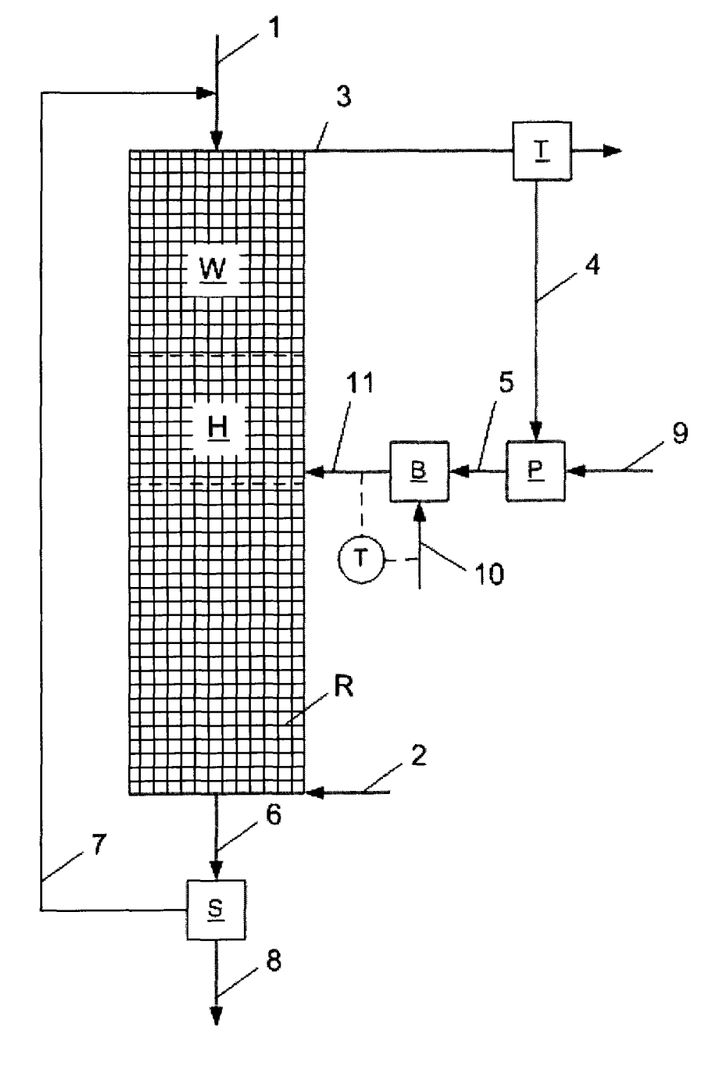
FIG. 1 shows a variant of the method of the invention, in which methane is decomposed into hydrogen and carbon in a high-temperature zone arranged in a bed of carbon-comprising granular material.

Via the feed conduit 1, a carbon-comprising granular material, for example broken coke, is introduced at ambient temperature, advantageously 0 to 300° C., preferably 10 to 150° C., in particular 50 to 100° C., from above into the reaction space R through which it is then conveyed downward under the action of gravity in a moving bed W. A methane-comprising gas 2, for example natural gas, is at the same time introduced from below into the reaction space R and conveyed upward in countercurrent through the moving bed W. The gas 2, which is at ambient temperature, advantageously 0 to 100° C., preferably 10 to 50° C., on entering the reaction space R, is heated on its way upward by direct heat exchange with the moving bed W. In the high-temperature zone H, in which temperatures above 1000° C. prevail, methane is decomposed into hydrogen and carbon, with the carbon being predominantly deposited on the carbon-comprising particles of the moving bed W. The hot hydrogen formed flows upward again and is cooled by direct heat exchange with the moving bed W so that a hydrogen-comprising gas having a temperature which is not significantly above ambient temperature, advantageously 50 to 800° C., preferably 100 to 500° C., can be taken off via line 3. In the separation device T, a part 4 of the hydrogen is separated off from the hydrogen-comprising gas 3 and subsequently introduced at a constant flow rate into an apparatus for introduction of electric energy, e.g. a plasma generator P, where it is heated to form a heat transfer medium 5. The plasma generator P is operated using excess power 9 which is supplied with a power which fluctuates over time. The temperature of the heat transfer medium 5 fluctuates between a minimum value and a maximum value as a function of the instantaneous power of the excess electric power 9. To set the temperature of the heat transfer medium to a predetermined prescribed value, an oxidant 10, either oxygen, air or oxygen-enriched air, is fed under quantity regulation into the heat transfer medium 5 via the burner B. The temperature of the heat transfer medium 11 downstream of the burner B serves as regulated variable. The heat transfer medium 11 is subsequently introduced into the high-temperature zone H where it provides the energy necessary for the decomposition of methane. At the lower end of the reaction space R, granular material 6 is taken off at virtually ambient temperature, advantageously 10 to 400° C., preferably 20 to 200° C.; this can, owing to the carbon deposits, be used as, for example, blast furnace coke or coking plant additive. Constituents of the granular material 6 which do not meet quality requirements because they have an excessively large (<80 mm) or unacceptably small diameter (<35 mm) or, for example, a strength which is too low (drum strength I40 for blast furnace coke >40% in accordance with ISO/FDIS 18894:2003) are separated off by sieving and/or classification in the separation device S and, after possible comminution, recirculated via a line 7 to the reaction space R. The remainder 8 is blast furnace coke which is passed on as high-value product.

The invention claimed is:

1. A method of carrying out a heat-consuming chemical conversion process, wherein a total energy required averaged over a year for the heat-consuming process originates from at least two different energy sources, where one of the energy sources is an electric energy source from a power grid whose power provided from the power grid varies in the range from 0 to 100% of the total power required at any given time such that, averaged over the year, at least 10% of the total energy required for the heat-consuming process is provided by the electric energy source, and where an excess power, which is defined as a power which is offered on a power market at well below generation costs or at prices which, based on energy content, are lower than for a fossil fuel having a same joule value or for nothing or even at negative prices, is used without intermediate storage or prior smoothing/compensation in a power station in the heat-consuming process, and wherein the following three different energy modes can individually provide the total power required at any given time for the heat-consumer process: (i) exclusively electric energy, (ii) a mixture of electric energy and a further nonelectric energy source or (iii) exclusively nonelectric energy, where a change of energy sources/energy modes is effected while carrying out the heat-consuming process and changeover time in which the change from one energy mode to another energy mode is completed is not more than 30 minutes, where the nonelectric energy source is supplied by oxidative processes, and thermal energy which is taken from the electric energy source with power which fluctuates over time, and which is for the heat-consuming process, is supplied by inductive or resistive methods, plasma processes, heating by electrically conductive heating elements/contact areas or by microwaves, the two or more energy sources being connected in series or in parallel.

2. The method as claimed in claim 1, wherein the efficiency of the electric energy source whose power varies in the range from 0 to 100% of the total power required is greater than 90%.

3. The method as claimed in claim 1, wherein at least 75% of the electric energy used is provided by excess power and/or nighttime power.

4. The method as claimed in claim 1, wherein, averaged over a year, at least 10% of the total energy required for the heat-consuming process is drawn from the electric energy sources having a fluctuating power output.

5. The method as claimed in claim 1, wherein a process stream whose heat is subsequently utilized for the heat-consuming process are heated by the electric power.

6. The method as claimed in claim 1, wherein the heat flow supplied to the heat-consuming process fluctuates by not more than 10% during the changeover time.

7. The method as claimed in claim 1, wherein the changeover time is not more than 7.5 minutes.

8. The method as claimed in claim 1, wherein the energy consumption of the heat-consuming process is greater than 0.5 MW/m3 in the reaction zone.

9. The method as claimed in claim 1, wherein the by-product selectivity of the heat-consuming processes is increased by a maximum of 1% during the change of the energy sources.

10. The method as claimed in claim 1, wherein thermal energy is generated oxidatively in a nonelectric energy source.

11. The method as claimed in claim 10, wherein electrically heated radiation tubes and oxidatively heated radiation tubes are arranged alternately in the reaction zone of the heat-consuming process.

12. The method as claimed in claim 1, wherein the changeover time is not more than 60 seconds.

13. The method as claimed in claim 1, wherein the heat-consuming process is steam reforming and dry reforming, the thermolysis of water, the dehydrogenation of ethylbenzene to styrene, of propane to propene, of butane to butene and/or of cyclohexane to benzene, the pyrolysis and cracking of hydrocarbons, pyrolytic acetylene production, the preparation of benzene from methane, the reduction of carbon dioxide to carbon monoxide, the preparation of hydrocyanic acid from methane and ammonia and/or the preparation of nitrogen monoxide from nitrogen and oxygen.

14. The method as claimed in claim 1, wherein in energy mode (ii), thermal energy from the electric energy source is supplied to a process stream in a first heating step and if the instantaneous power of the electric energy source is not sufficient, the temperature of the process stream is increased to the desired value further downstream in a second heating step by introduction of thermal energy from a nonelectric energy source.

15. The method as claimed in claim 1, wherein in energy mode (ii), the process stream is firstly preheated by thermal energy from a nonelectric energy source and subsequently brought to the desired temperature by electrically generated heat.

16. The method as claimed in claim 1, wherein one of the energy sources is an electric energy source whose power varies in the range from 0 to 100% of the total power required at any given time such that, averaged over the year, at least 15% of the total energy required for the heat-consuming process is provided by the electric energy source.

17. The method as claimed in claim 1, wherein one of the energy sources is an electric energy source whose power varies in the range from 0 to 100% of the total power required at any given time such that, averaged over the year, at least 20% of the total energy required for the heat-consuming process is provided by the electric energy source.

18. The method as claimed in claim 1, wherein one of the energy sources is an electric energy source whose power varies in the range from 0 to 100% of the total power required at any given time such that, averaged over the year, at least 25% of the total energy required for the heat-consuming process is provided by the electric energy source.

19. The method as claimed in claim 1, wherein at least 50% of the electric energy used is provided by excess power and/or nighttime power.

\* \* \* \* \*

UNITED STATES PATENT AND TRADEMARK OFFICE
CERTIFICATE OF CORRECTION

PATENT NO. : 10,351,422 B2  
APPLICATION NO. : 14/651862  
DATED : July 16, 2019  
INVENTOR(S) : Otto Machhammer et al.

Page 1 of 1

It is certified that error appears in the above-identified patent and that said Letters Patent is hereby corrected as shown below:

In the Claims

Column 14, Line 22, Claim 8, delete "0.5 MW/m3" and insert -- 0.5 MW/m$^3$ --.

Signed and Sealed this  
Twenty-first Day of April, 2020

Andrei Iancu  
*Director of the United States Patent and Trademark Office*